United States Patent [19]
Brindamour

[11] Patent Number: 5,088,445
[45] Date of Patent: Feb. 18, 1992

[54] ANIMAL CAGE COVER AND LITTER CATCHER

[76] Inventor: Elizabeth C. Brindamour, 15050 Fenton, Redford, Mich. 48239

[21] Appl. No.: 579,488

[22] Filed: Sep. 10, 1990

[51] Int. Cl.⁵ .............................................. A01K 31/00
[52] U.S. Cl. ........................................................ 119/17
[58] Field of Search ................... 49/95, 161, 165, 169, 49/170, 174, 17

[56] References Cited

U.S. PATENT DOCUMENTS

| | | | |
|---|---|---|---|
| 341,540 | 5/1886 | Armstrong | 119/17 |
| 1,094,423 | 4/1914 | Brandt | 119/17 |
| 2,002,925 | 5/1935 | Robison | 119/17 |
| 2,028,612 | 1/1936 | Kosvicit | 119/17 |
| 2,045,472 | 6/1936 | Kearney et al. | 119/17 |
| 2,845,895 | 8/1958 | Balkauskas | 119/17 |
| 4,947,794 | 8/1990 | Baldwin | 119/17 |

Primary Examiner—Gene Mancene
Assistant Examiner—R. Thomas Price
Attorney, Agent, or Firm—Daniel H. Bliss

[57] ABSTRACT

A litter catcher and cover are provided for an animal cage which are easily removed and cleaned. The litter catcher employs a frame, a sheet supported along its periphery by the frame, and hooks for attaching the frame to the animal cage. The sheet is fastened to the frame by Velcro or other fasteners. The cover is severed from its center to one of its edges so as to form two sides. The sides are fastened to each other by Velcro or other fasteners.

9 Claims, 2 Drawing Sheets

U.S. Patent     Feb. 18, 1992     Sheet 2 of 2     5,088,445
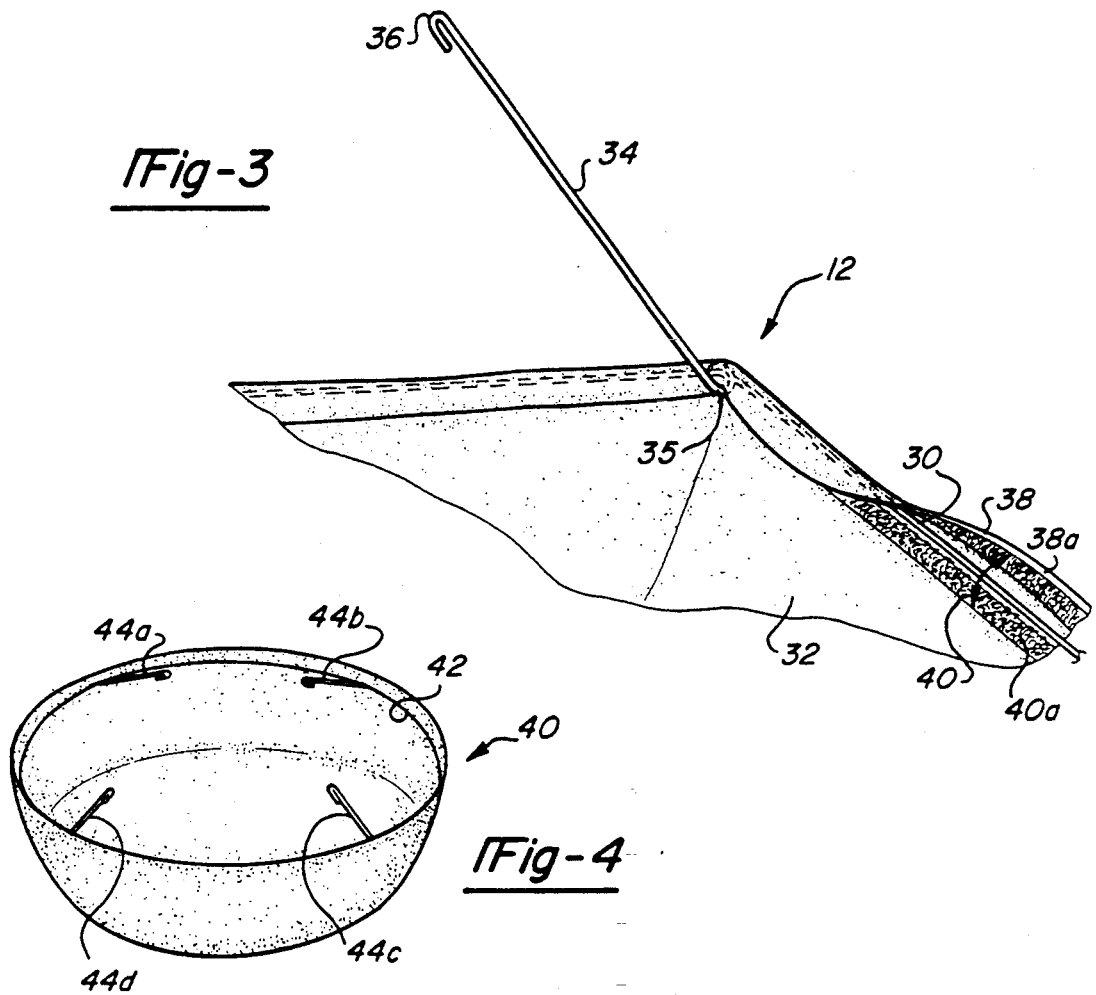
*Fig-3*
*Fig-4*
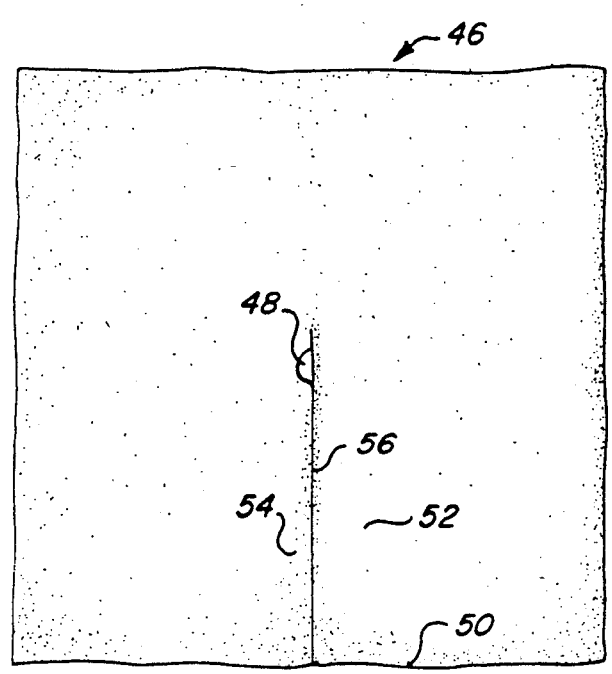
*Fig-5*

ANIMAL CAGE COVER AND LITTER CATCHER

BACKGROUND OF THE INVENTION

1. Field of the Invention

The present invention relates generally to animal cages, and more particularly to, a cover and litter catcher for a bird cage.

2. Description of the Related Art

Animal cages such as bird cages are generally a wire cage having a floor for catching litter, waste and debris. To facilitate cleaning of the cage, access to the floor is usually provided. Some bird cages come equipped without a floor, the floor being purchased separately. One example of such a floor or litter catcher includes a cloth or similar material. The periphery of the material is wrapped and sewn around a wire frame to form a basket. The material making up the basket, however, must be cleaned while attached to the frame, thereby making cleaning of the material in a conventional washing machine impractical.

Bird cage covers are also well documented. The covers are typically used to calm excited birds. For bird cages using a structure on the roof of the cage for suspending the cage from above, a cover is provided from a single continuous sheet of material having a centrally located aperture through which the structure is passed. To totally remove this type of cover, the bird cage must generally be unlatched and lowered to dispose the cover about the cage.

SUMMARY OF THE INVENTION

It is, therefore, one object of the present invention to provide a cage floor that can be removed and more easily washed than prior cage floors.

It is another object of the present invention to provide a litter catcher for a bird cage in which the material for the litter catcher may be removed from a frame for cleaning and replacement.

It is yet another object of the present invention to provide a litter catcher which eliminates sewing of the material about a frame.

It is still another object of the present invention is to provide a cage cover which is easily removable from a hanging cage without unlatching and lowering of the cage.

Thus, in accordance with the teachings of the present invention, an animal cage litter catcher is provided. The litter catcher employs a frame, means for attaching the frame to the animal cage and means removably attached to the frame for catching litter from the animal cage, thereby facilitating removal for cleaning.

The present invention also provides an animal cage cover having a sheet which is severed from its center to one of its edges so as to form two sides. The sides are fastened together by a fastening strip or other fasteners to facilitate removal of the cover without unlatching and lowering the animal cage.

Other objects, features and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a partial perspective view of a corner portion of the litter catcher of FIG. 2.

FIG. 4 is a perspective view of a circular embodiment of a litter catcher according to the present invention.

FIG. 5 is a plan view of a cover according to the present invention for the animal cage of FIG. 1.

DESCRIPTION OF THE PREFERRED EMBODIMENT(S)

Figure 1:
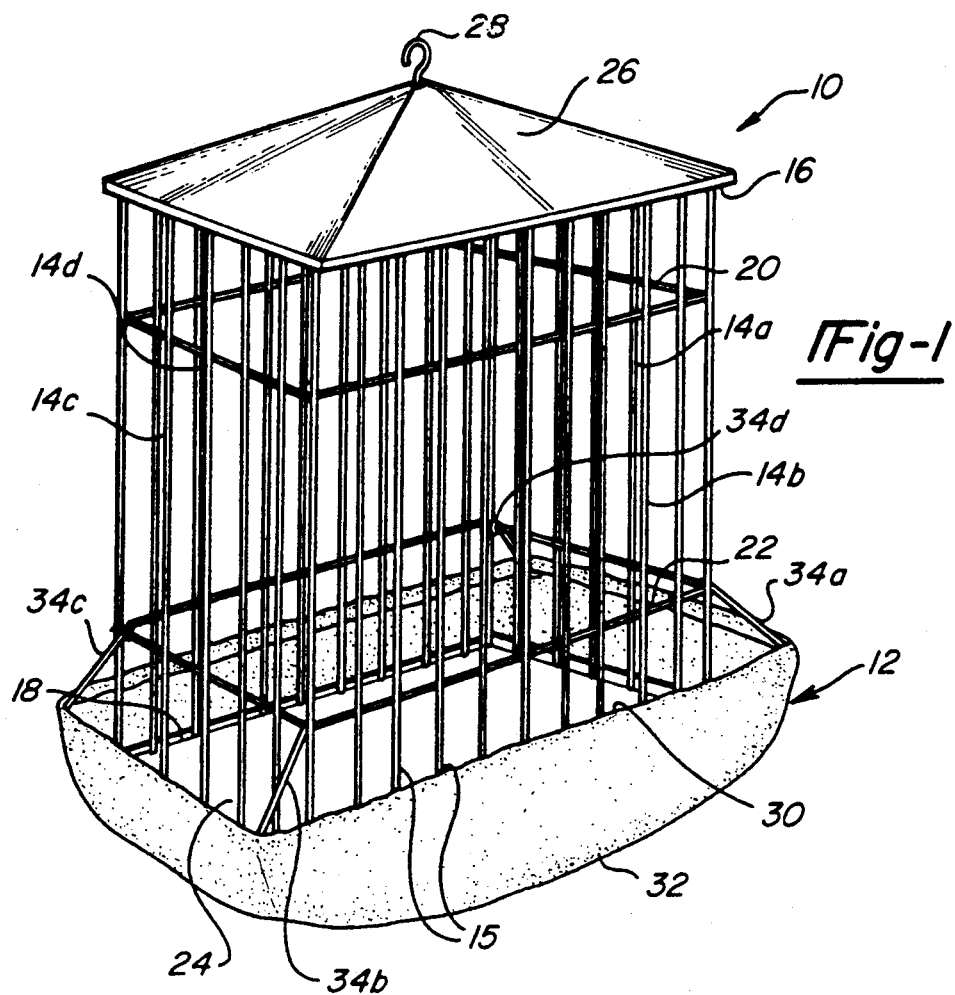
FIG. 1 is perspective view of an animal cage employing a litter catcher according to the present invention.

Referring to FIG. 1, an animal cage such as a bird cage 10 is shown for use with a litter catcher, generally indicated at 12 and according to the present invention, for catching objects or litter from the cage 10. In a preferred embodiment, the cage 10 is rectangular in shape, although any shape is suitable for use with the present invention.

The cage 10 has four vertical walls 14a, 14b, 14c, 14d, each wall employing a generally parallel arrangement of spaced vertical wires 15. The space between the vertical wires 15 is small enough to prevent escape of an animal such as a bird. The vertical wires 15 are preferably made of metal wire. The vertical wires 15 are held in place by generally horizontal upper and lower support wires 16 and 18 around the perimeter of the top and bottom of the cage 10, respectively. Rigidity between the top and bottom of the cage 10 is provided by a pair of vertically spaced and generally horizontal ribs 20 and 22, each rib is a wire, preferably made of metal, extending around the entire perimeter. The lower support wire 18 forms the boundary for an aperture 24 at the bottom of the cage 10. The top of the cage 10 is covered by a roof 26 which is attached by suitable means to the upper support wire 16. The roof 26 has an attachment structure such as a hook 28 to suspend the cage 10 from a support structure such as a pole (not shown). It should be appreciated that the support wires 16 and 18 and ribs 20 and 22 are secured to the wires 15 by suitable means such as welding.

Figure 2:
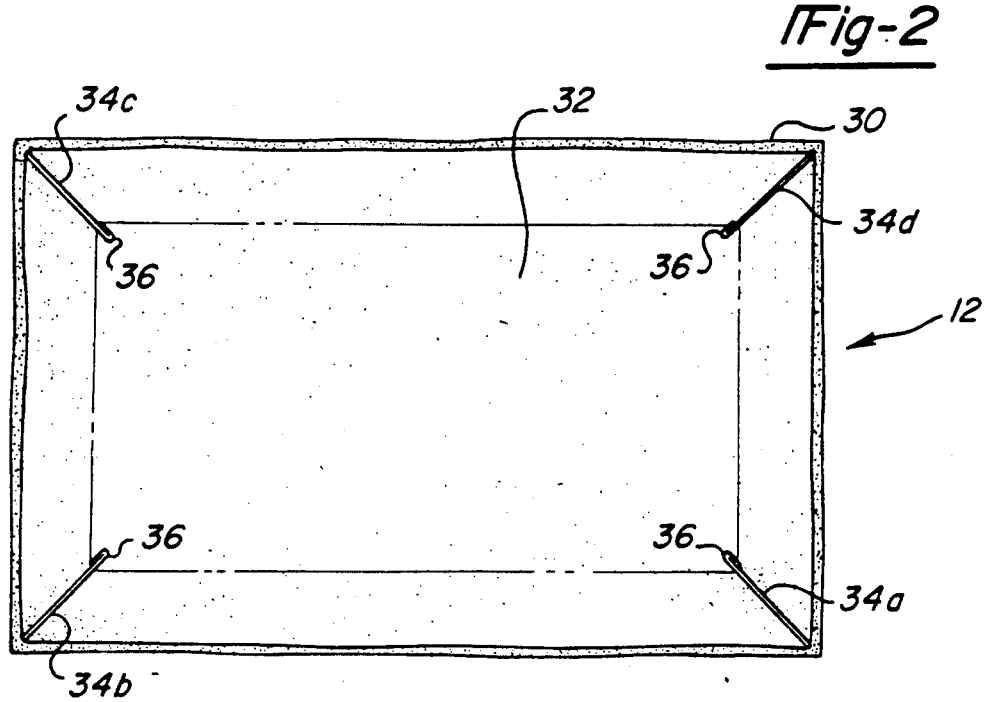
FIG. 2 is a plan view of the litter catcher of FIG. 1.

Referring to FIGS. 1 through 3, the litter catcher 12 includes a frame 30, which, in the preferred embodiment, is rectangular in shape and made of a metal wire. Other embodiments envision wooden or plastic inserts united at the corners by wooden or plastic fasteners. The litter catcher 12 also includes a sheet 32 attached to the frame 30 which can be made of cloth, vinyl, clothlike or other suitable material. Preferably, the sheet 32 is a single continuous sheet of material. It should be appreciated that the sheet 32 could be made of a suitable disposable material such as tissue.

The frame 30 is connected to the cage 10 by a suitable structure such as a plurality of hook members 34a, 34b, 34c, 34d. The hook members 34a, 34b, 34c, 34d are preferably made of metal wire. The hook members 34a, 34b, 34c and 34d have one end 35 pivotally wrapped or disposed around the frame 30 and have another end 36 with an inverted "V" or "U" shape which is adapted to be disposed about the horizontal rib 22 near the corners of the cage 10. The corners of the frame 30 are exposed to accommodate the hook members 34a, 34b, 34c, 34d. It should be appreciated that the length of the hook members 34a, 34b, 34c, 34d may be varied to support the frame 30 in generally vertical spaced relation to the lower horizontal wire 18 or allow the end 36 to be attached at another location on the cage 10.

Turning now to FIG. 2, the litter catcher 12 is shown in more detail. The frame 30 is larger in size than the perimeter of the aperture 24 for the cage 10 when the litter catcher 12 is mounted to the cage 10, so as to provide a greater surface for catching objects, litter, debris or the like. The hook members 34a, 34b, 34c, 34d have the end 36 slanted or pivoted inwardly towards the rib 22. It should be appreciated that the frame 30 extends longitudinally and laterally a predetermined distance beyond the walls 14a, 14b, 14c, 14d of the cage 10, such as four (4) inches.

As shown in FIG. 3, the sheet 32 is easily removable from the frame 30. The sheet 32 is supported along its periphery by the frame 30. The sheet 32 has cooperating surfaces 38 and 40 facing each other to cover the frame 30. The cooperating surface 38 carries a plurality of hook-like members 38a and the cooperating surface 40 carries a felt-like material 40 to form a fastening means known as Velcro. It should be appreciated that the sheet 32 is attached to the frame 30 by Velcro fasteners but may also be attached by snaps or other suitable fastening means. The hook members 34a, 34b, 34c and 34d extend between the surfaces 38 and 40, preferably at the corners of the frame 30. Advantageously, no special holes need be cut into the sheet 32. The fastening means 38a and 40a allow the sheet 32 to be removed from the frame 30 and cleaned in a conventional washing machine or discarded and replaced. The litter catcher 12 may also be provided as a kit which may be assembled and attached to the cage 10.

Referring to FIG. 4, there is shown an alternative embodiment 41 for a cage having a circular bottom. The litter catcher 41 is round in shape having a circular frame 42 with a larger diameter than a diameter of the circular bottom of the cage so as to provide a larger surface for catching debris. The frame 42 has four points substantially equidistant for mounting hook members 44a, 44b, 44c and 44d. The hook members 44a, 44b, 44c and 44d are similar to the hook members 34 and are mounted to the rib 22 of the circular bottom bird cage in the same fashion as in the previous embodiment. It should be appreciated that the litter catcher 12 may have any suitable shape to correspond with the shape of the cage 10.

Turning now to FIG. 5, there is shown a cover, generally indicated at 46, for a cage 10 that is suspended from an attachment structure such as the hook 28 in the center of the roof 26, such as the cage 10 of FIG. 1. At the center of the cover 46 is a hole or aperture 48 through which the hook 28 passes. The cover 46 is severed from the aperture 48 to an edge 50 at its periphery to form a pair of adjacent sides 52 and 54. The two sides 52 and 54 of the cover 46 are fastened together by a fastening strip 56 such as Velcro or similar fasteners. As in the litter catcher 12 above, installation and removal of the cover 46 is facilitated while the cage 10 is hanging from its hook 28, thereby making unlatching and lowering of the cage 10 unnecessary. The cover 46 can thus be cleaned in a conventional washing machine more often.

The present invention has been described in an illustrative manner. It is to be understood that the terminology which has been used is intended to be in the nature of words of description rather than of limitation.

Many modifications and variations of the present invention as possible in light of the above teachings. Therefore, within the scope of the appended claims, the present invention may be practiced otherwise than as specifically described.

What is claimed is:

1. A litter catcher adapted for attachment to an animal cage, comprising:
   a frame;
   means for attaching said frame to the animal cage;
   means removably attached to said frame for catching objects from the animal cage;
   said catching means comprising a sheet supported along its periphery and wrapped around said frame and means for fastening and unfastening said sheet around said frame to allow said sheet to be removed from said frame for cleaning and replacement; and
   said fastening and unfastening means comprising cooperating surfaces along the periphery of said sheet and facing each other with one surface carrying a plurality of hook-like members and the other surface carrying a felt-like material, said surfaces being engageable and disengageable with each other.

2. The litter catcher of claim 1 wherein said frame is made of wire.

3. The litter catcher of claim 1 wherein said frame is made of wood.

4. The litter catcher of claim 1 wherein said frame is larger in area than a bottom of the animal cage and extends beyond a periphery of the bottom of the animal cage.

5. The litter catcher of claim 1 wherein said frame is substantially circular.

6. The litter catcher of claim 1 wherein said frame is substantially rectangular.

7. The litter catcher of claim 1 wherein said attaching means comprises a plurality of hooks having one end pivotally connected to said frame and adapted to pivot relative to said frame and another end engageable and disengageable with the animal cage.

8. A litter catcher adapted for attachment to a bird cage, comprising:
   a frame, said frame being larger in area than a bottom of the bird cage and extending beyond a periphery of the bottom of the bird cage;
   means for attaching said frame to the bird cage;
   a sheet supported along its periphery and wrapped around said frame, said sheet including means for fastening and unfastening said sheet around said frame to allow said sheet to be removed from said frame for cleaning and replacement;
   said fastening and unfastening means comprising cooperating surfaces along the periphery of said sheet and facing each other and a plurality of snaps along said surfaces being engageable and disengageable with each other.

9. A litter catcher adapted for attachment to a bird cage, comprising:
   a frame, said frame being larger in area than the bottom of the bird cage and extending beyond a periphery of the bottom of the bird cage;
   means for attaching said frame to the bird cage;
   a sheet supported along its periphery and wrapped around said frame, said sheet including means for fastening and unfastening the periphery of said sheet around said frame to allow said sheet to be removed from said frame for cleaning and replacement;

said fastening and unfastening means comprising cooperating surfaces along the periphery of said sheet and facing each other with one surface carrying a plurality of hook-like members and the other surface carrying a felt-like material, said surfaces being engageable and disengageable with each other; and said attaching means comprising a plurality of hooks having one end pivotally connected to said frame and adapted to pivot relative to said frame and another end engageable and disengageable with the bird cage.

* * * * *